United States Patent
Thorsen et al.

(10) Patent No.: US 7,972,514 B2
(45) Date of Patent: Jul. 5, 2011

(54) METHOD AND A SYSTEM FOR PERFORMING MAINTENANCE ON A MEMBRANE USED FOR PRESSURE RETARDED OSMOSIS

(75) Inventors: Thor Thorsen, Trondheim (NO); Torleif Holt, Trondheim (NO)

(73) Assignee: Statkraft Development AS (NO)

( * ) Notice: Subject to any disclaimer, the term of this patent is extended or adjusted under 35 U.S.C. 154(b) by 454 days.

(21) Appl. No.: 12/158,321

(22) PCT Filed: Dec. 20, 2006

(86) PCT No.: PCT/NO2006/000493
§ 371 (c)(1),
(2), (4) Date: Aug. 22, 2008

(87) PCT Pub. No.: WO2007/073207
PCT Pub. Date: Jun. 28, 2007

(65) Prior Publication Data
US 2009/0008330 A1  Jan. 8, 2009

(30) Foreign Application Priority Data
Dec. 22, 2005 (NO) .................................. 20056125

(51) Int. Cl.
*B01D 65/02* (2006.01)

(52) U.S. Cl. .................... 210/636; 210/108; 210/139

(58) Field of Classification Search .............. 210/636, 210/108, 139
See application file for complete search history.

(56) References Cited

U.S. PATENT DOCUMENTS
| | | | |
|---|---|---|---|
| 4,283,913 A * | 8/1981 | Loeb | .......................... 60/641.9 |
| 5,948,254 A | 9/1999 | Scott | |
| 2004/0134521 A1 | 7/2004 | Liberman | |

FOREIGN PATENT DOCUMENTS
| | | |
|---|---|---|
| EP | 0768112 | 4/1997 |
| WO | 00/48943 | 8/2000 |
| WO | 02/13955 | 2/2002 |
| WO | 2005/123232 | 12/2005 |
| WO | WO2005123232 A2 * | 12/2005 |

OTHER PUBLICATIONS
Written Opinion and Search Report mailed May 6, 2008 for International application No. PCT/NO2006/000493, filed Dec. 20, 2006.

* cited by examiner

*Primary Examiner* — Walter D Griffin
*Assistant Examiner* — Denise R Anderson
(74) *Attorney, Agent, or Firm* — Knobbe Martens Olson & Bear LLP

(57) ABSTRACT

A method and system for performing maintenance on a membrane having semi-permeable properties and is used in a pressure retarded osmosis PRO, the membrane having a high pressure first side and second side of lower pressure. A time controllable first valve or pump (31; 41; 51; 61; 71; 81; 91) is connected between an input (12) to the low pressure side of the membrane (13') and an input (11) to the high pressure side of the membrane (13'), said first valve or pump operable to selectively deliver a plug (21) of a second type of water (FW) to the first side of the membrane to lower concentration of dissolved substance (s) in water of a first type (SW) thereat, thereby creating a PRO pressure backwash function with the water of the second type (FW) from the first to the second side of the membrane pressurized on said first side by high pressure supply of water of the first type (SW) upstream of said plug (21) of water of the second type (SW).

22 Claims, 8 Drawing Sheets

METHOD AND A SYSTEM FOR PERFORMING MAINTENANCE ON A MEMBRANE USED FOR PRESSURE RETARDED OSMOSIS

The present invention relates to a method and a system for performing maintenance on a membrane having semi-permeable properties for use based on pressure retarded osmosis PRO, the membrane having a high pressure first side and second side of lower pressure, as indicated in the attached claims.

Such a membrane, as well as a method and a device for providing electric power through the use of pressure retarded osmosis is disclosed in Norwegian Patent 314575. The disclosed membrane has a thin layer of a non-porous material, the so-called diffusion skin, and a porous layer. The reference to said patent implies inclusion of its disclosure in this specification.

During the normal PRO operation of that prior art technique, i.e. when such a device is to provide power, the first side of the membrane is configured to receive a high pressure supply of sea water, and correspondingly the second side of the membrane is configured to receive a low pressure supply fresh water.

A pressure retarded osmosis power plant is comparable to a reverse osmosis desalination plant running backwards. However, a PRO plant will be able to generate power from freshwater in stead of consuming power. Filtered fresh water enters the membrane from the low pressure side thereof and a high percentage of the fresh water, e.g. 70-90%, is transferred by osmosis across the membrane into the pressurized sea water on the high pressure side of the membrane, which preferably may have the diffusion skin oriented toward the high pressure side. The osmotic process increases the volumetric flow of high pressure water and is the key energy transfer in such a power plant. This requires a membrane that has a high water flux and a high salt retention. Typical membrane performance should be at least 4 W per square meter of membrane face area, although higher performance may be conceivable. Salt water is pumped from the sea or another source of saline water and filtered before pressurisation and feeding to the membrane. A potential consideration could be in special cases to replace salt by a solute containing different substance(s). In a module containing the membrane, the sea water is diluted by freshwater coming through the membrane, and volumetric feed of sea water is typically approximately twice that of the fresh water.

As disclosed in said Norwegian Patent, the resulting brackish water from the membrane module is split in two flows, approximately ⅓ of the brackish water going to the turbine to generate power and approximately ⅔ returning via a pressure exchanger to an outlet, thereby by means of the pressure exchanger contributing to the pressurisation of the feed of sea water. Suitably, the sea water pressure is in the range of 11-15 bars, equivalent to a water head 100-150 meters in a hydro-power plant, which implies the power generation in the range of 1 MW per cubic meter per second of supplied fresh water.

Some pre-treatment of supplied sea water and fresh water must be performed through use mechanical filtering. However, although mechanical filtering may be effective in most cases, there are nevertheless particles and microbes that are not filtered away and which pass into the membrane from the low pressure side. Over time the performance of the membrane will be reduced and accordingly the performance of the power plant, unless some maintenance is performed to clean the membrane.

One way to perform maintenance would be to remove membranes for cleaning and reinstall thereafter the membranes for further operation, or install replacement membranes when the other membranes are cleaned. However, a power plant should to the extent possible provide power on an continuous basis, with a minimum of down time or reduced capacity, and above all with a minimum of maintenance staff to carry out removal, cleaning and reinstalling. It will also be appreciated that physical removal of a large number of membranes for cleaning would also be very time consuming and would require numerous of membrane module inlet and outlet shut-off valves. However, if a small number of modules at a time is subjected to maintenance/cleaning through such physical removal and reinstalling, it could imply that 0.25%-1% of the modules are removed and reinstalled on a daily basis, yielding that the plant will have a reduced capacity by 0.25-1% if maintenance takes a full day. More frequent measures, such as cleaning, has to be made in-situ, and should not take more than a few seconds or minutes, dependent on the frequency of such measures per module. The present invention is typically directed at providing for such more frequent measures to be made possible in an efficient, simple manner. It will be appreciated at major maintenance or washing/cleaning of a module should not need to be made more frequent than, say, every 6 to 24 months.

It has therefore been an object of the present invention to avoid a time consuming, technically complicated and expensive maintenance, and in stead provide a very efficient method and system for performing such maintenance, and which will require a minimum of staff, a minimum of time and no membrane removal/reinstalling. The invention has also as an object to provide for remote control of the maintenance.

In the context of the present invention, the use of a skin on e.g. the high pressure side of the membrane is suitably best defined by the general term "a semi-permeable material".

In view of the fact that most power plants normally provide more power output than required at a specific point of time, it will be appreciated that a temporary power loss of say 5-10% will not be critical, which implies that the plurality of membranes (or membrane modules) required in such a plant can be subjected to maintenance, i.e. cleaning, by performing cleaning operation on the membranes successively, or the membranes as groups.

According to the present invention the method comprises introducing a plug of a second type of water on the first side of the membrane to alter concentration of dissolved substance(s) in water of a first type thereat, said second type of water having a concentration of dissolved substance(s) lower than that of the first type of water, and creating a PRO pressure backwash function with the water of the second type from the first to the second side of the membrane by applying the high pressure of the water of the first type on said first side onto the plug of water of the second type.

Further embodiments of the method will appear from the attached sub-claims as well the detailed disclosure with reference to the attached drawing figures.

According to the present invention, the system comprises: a time controllable first valve or pump connected between an input to the low pressure side of the membrane and an input to the high pressure side of the membrane, said first valve or pump operable to selectively deliver a plug of a second type of water to the first side of the membrane to alter concentration of dissolved substance(s) in water of a first type thereat, thereby creating a PRO pressure backwash function with the water of the second type from the first to the second side of the membrane pressurized on said first side by the high pressure of water of the first type applied onto the plug of water of the second type, said second type of water having a concentration of dissolved substance(s) lower than that of the first type of water. This implies that the PRO pressure backwash function is provided by use of the water of the second type from the first to the second side of the membrane pressurized on the first side by the high pressure of the first type of water that already exists because of the PRO process and can be supplied from either upstream or downstream of the membrane module in the hydraulic flow line for the first type of water. In other words, there is used an already existing pressure available on the first side of the membrane. Thus, no hydraulic pressure is created particularly for the backwashing operation.

Further embodiments of the system will appear from the attached sub-claims as well the detailed disclosure with reference to the attached drawing figures.

The present invention is now to be further described with reference the enclosed drawing figures which indicate alternative, though not limitative embodiments of the present invention.

FIG. 6b illustrates a PRO pressure backwash embodiment applied on a sub-surface PRO power plant installation as shown on FIG. 1b and also indicated on FIG. 11, and represents an alternative to the surface PRO power plant installation embodiment of FIG. 6a.

Figure 1A:
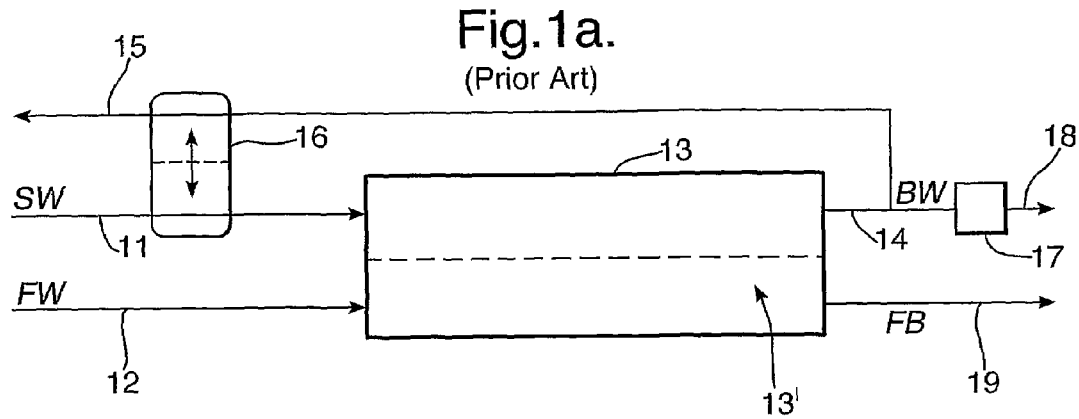
FIG. 1a illustrates the prior art PRO power plant structure of Norwegian Patent 314575.

In the description below of the present invention and with reference to the attached drawings, the following abbreviations will be used for the various water flows:

SW=a first type of water, e.g. sea water
FW=a second type of water
FB=bleed of a second type of water, e.g. fresh water bleed
BW=brackish water
PRO=Pressure Retarded Osmosis
DA=Disinfecting agent
SW side=first side
FW side=second side FIG. 1a illustrates in general terms the prior art PRO power plant disclosed in Norwegian Patent 314575 having a pressurised SW inlet 11 and a FW inlet 12. Typically the prior art SW pressure is in the vicinity of 12 bar at the inlet to the membrane module and the FW pressure is less than 0,5 bar, which implies in this example that the BW pressure will be less than 0,5 bar lower than the SW pressure at the entry to the membrane module. These pressure figures are however just typical examples, and should not in any way be considered to be limitative to the scope of the present invention which to be further described. One or more membranes 13' are present in a membrane module or membrane rig 13. In a practical embodiment of a PRO power plant it will be understood that a plurality of such modules or rigs will be used. Due to the PRO process, the outlet 14 on the high pressure side of the module will deliver BW at a pressure somewhat lower 12 bar, e.g. less than 0.5 bar lower, and in the typical example also mentioned in the introduction, approximately ⅔ of the BW will pass to a BW outlet 15 via a pressure exchanger 16 which provides for pressure application to the SW inlet 11. The remaining ⅓ of the BW will pass through a turbine 17 to BW outlet 18. The FB from the membrane module through the low pressure outlet 19 will typically have in the present example a pressure less than 0.5 bar and somewhat below the FW pressure.

Figure 1B:
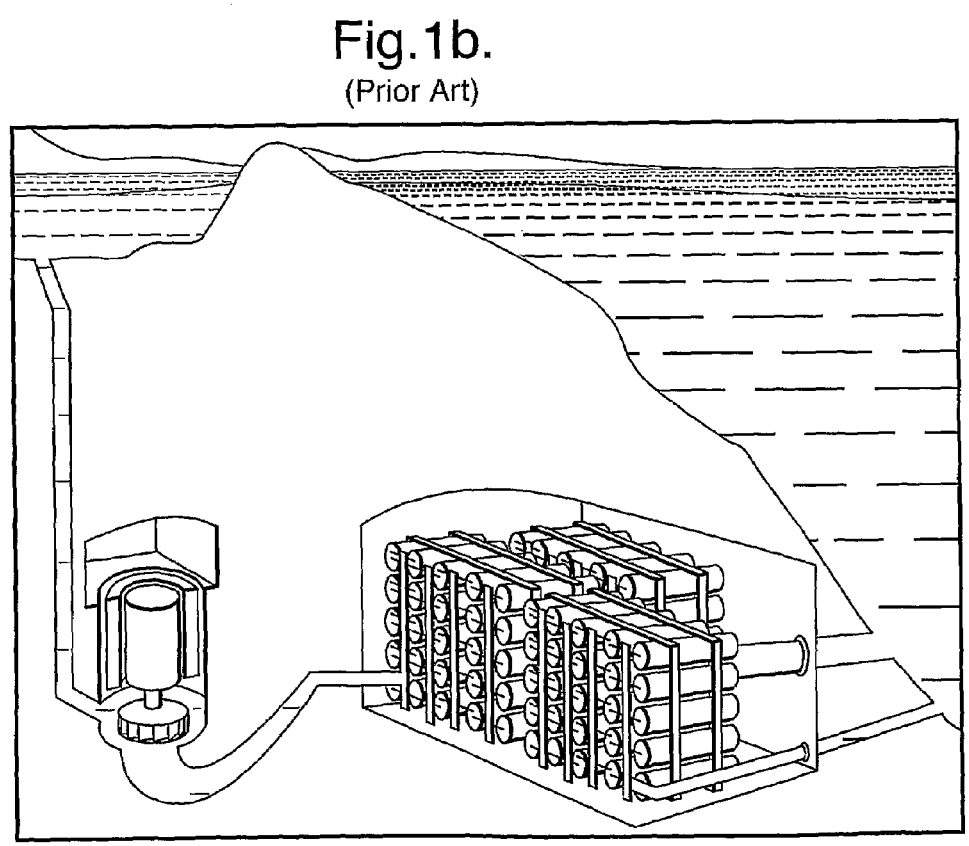
FIG. 1b illustrates another prior art structure in the form of a sub-surface or sub-sea PRO power plant.

FIG. 1b illustrates a variant of the embodiment of FIG. 1a. FIG. 1b shows a sub-surface or sub-sea PRO power plant, as further shown and described in connection with FIG. 11. It is noted at the pressure exchanger 16 as shown on FIG. 1a is no longer present, as the submerging of the power plant makes installation of a pressure exchanger 16 unnecessary. In a sub-surface or submerged power plant, FW having high pressure is directed via the turbine 17', which is located on the FW side of the membrane rig 13 upstream thereof and then directly to the FW side of the membrane rig 13.

In the following drawing figures, the turbine 17 has for simplicity reason not been shown, as it does not form part of the backwash operation. It should however be considered present. Although just one membrane module is shown, it will be appreciated that two or more modules or rigs may be present. A single pressure exchanger may operate on one module, although preferably there will be several modules connected to each pressure exchanger. This means that preferably several modules will be subjected to PRO pressure backwash simultaneously.

Figure 2A:
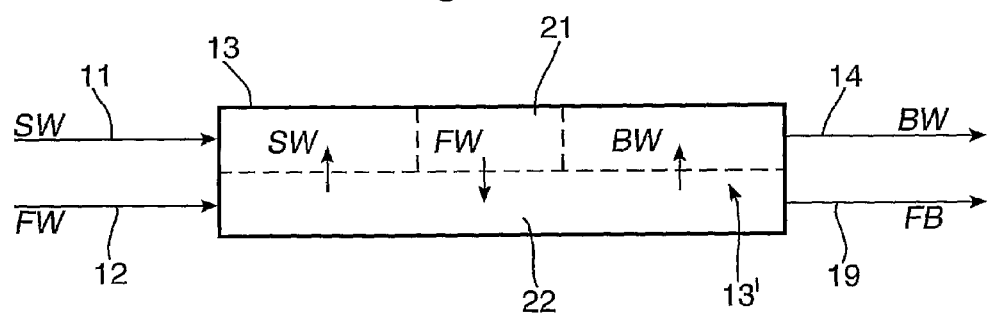
FIG. 2a illustrates some basic considerations related to membrane backwash in a PRO based power plant.

FIG. 2a illustrates the basic concept of the present invention. A plug 21 of FW has been injected into the SW flow and for the time that FW moves through the membrane to the low pressure side of the membrane (i.e. low pressure side of the membrane module, the osmotic process will stop. Accordingly, the FW will be pressed by the high pressure SW, which has a pressure higher than the pressure on the low pressure side of the membrane, through the membrane like backwash in common membrane filtration. It will be appreciated that if salt water or SW had been present on the normally low pressure side of the membrane as indicated by arrow 22, reverse flux could be increased, but the SW would need to diffuse or penetrate into the membrane structure first.

All the alternatives that are described below utilize one or two effects to achieve backwash:

Injection of FW in a section of, or the complete length of the membrane module 13 and thereby locally removing the osmotic driving force. The pressure in the SW line is maintained in the PRO power plant because the PRO process continues in other modules/rigs of the power plant. This pressure will force the water flux through the membrane in the opposite direction compared to PRO, thereby backwashing the membrane locally, as indicated on FIG. 2a. The opposite flux will drain water from, instead of feed water into the SW-side of the membrane. Thus the amount of brackish water from the backwashed modules/rigs will temporarily drop.

If SW is injected to the FW-side of the membrane in the location as FW is injected to the SW-side, there will be an osmotic force to drive water from the SW-side to the FW-side of the membrane. The resulting (osmotic) flux will come in addition to the backwards flux generated by the PRO pressure in the SW pipe, thereby increasing the total backwash water flux. The osmotic force will need some time to act because salt must diffuse into the membrane. This diffusion needs in the order of one minute, about the same time as the flow time through the module during PRO.

The exemplary embodiments to be discussed with reference to the drawings are in no manner to be considered exhaustive of the inventive concept, but are merely included to explain how the present invention could be put to practise.

In the PRO process a normal pressure of 4-30 bar could be present in the SW feed-in 11 and a pressure less than 1 bar, suitably less than 0.5 bar, in the FW feed-in 12. Suitably the higher pressure would be in the more restricted range 8-16 bar, and in experiments made the pressure has been 0-20 bar, but typically 12 bar. The pressures at the BW and FB outlets 14, 19 are suitably less than 0.5 bar below the respective SW and FW inlets 11, 12. These pressure levels can be maintained by modules/rigs that still are maintained in PRO operation. The local backwash in the PRO plant should be achieved with a minimum of valves, pumps and power loss, and from the disclosure to follow it will be appreciated that the invention offers a very efficient and simple backwash operation.

Whether backwashing is to take place in a whole module or only a section of its length at a time will have to be decided upon based on the actual structure of the module and/or the structure and operation of the power plant. Similarly, operational conditions and the power plant structure will dictate whether backwashing is to be carried out simultaneously in a few modules, just in one module/rig at a time or in a large number of modules/rigs simultaneously.

Figure 2B:
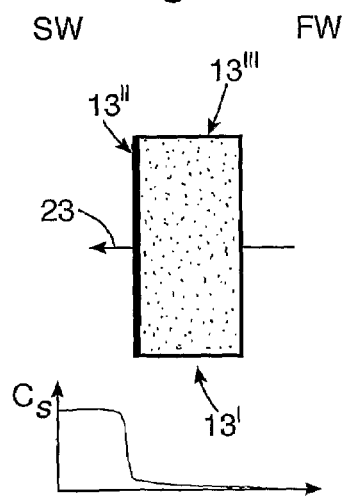
FIGS. 2b-2d are rather schematic illustrations of water fluxes and salt concentration profiles for PRO, backwash and enhanced backwash, respectively.

FIG. 2b illustrates PRO, the arrow 23 indicating osmotic water flux and Cs indicating concentration of salt in the module 13 relative to the membrane 13', where 13" indicates diffusion skin and 13''' indicates a porous structure. Whether the porous structure is layered or of other configuration, dependent materials of structure used, is unimportant in the present context as regards the understanding of the principles of the present invention.

Figure 2C:
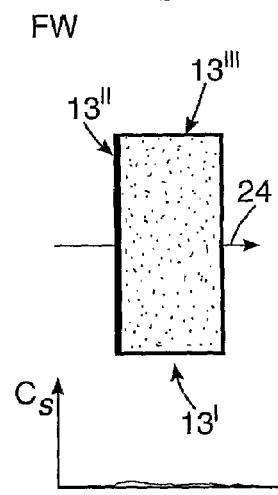

FIG. 2c illustrates backwash, reference numeral 24 indicating backwash flux driven by hydraulic pressure generated by PRO in the power plant.

Figure 2D:
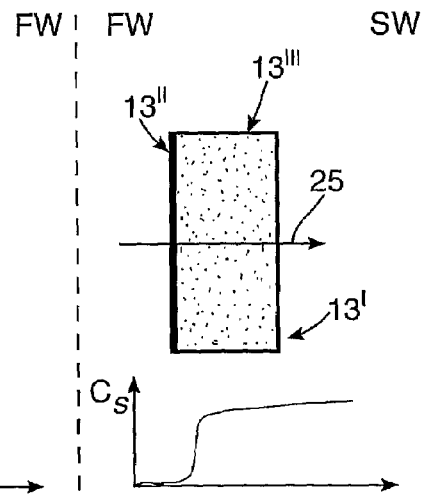

FIG. 2d illustrates enhanced backwash, reference numeral 25 indicating backwash flux driven by hydraulic pressure generated by PRO in the power plant and additionally local osmosis.

More detailed examples are now to be explained with reference to FIGS. 3-9.

Figure 3:
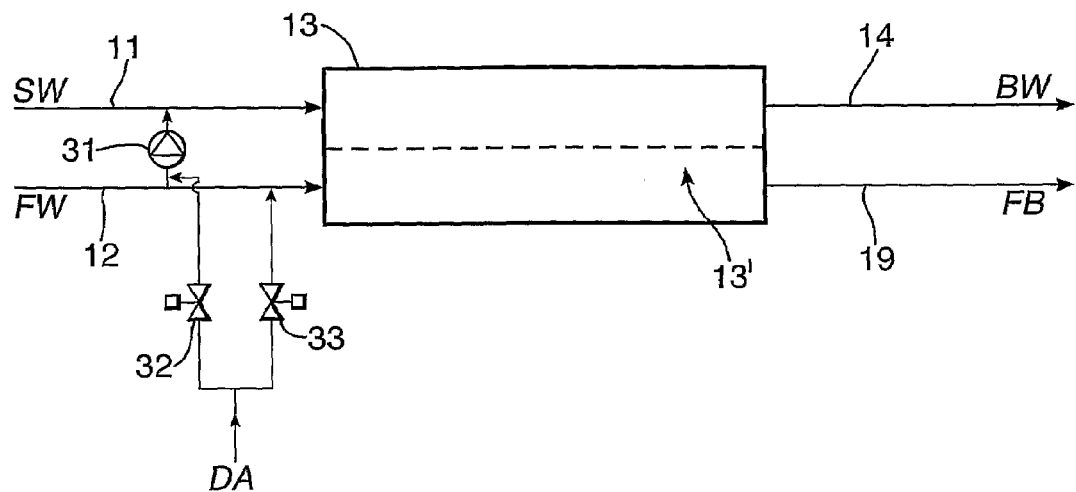
FIG. 3 illustrates a PRO pressure backwash embodiment applied on a surface PRO power plant installation.

FIG. 3 is the simplest version of the invention. Reference numeral 31 denotes a high-pressure volumetric pump with built-in no-return valve (e.g. like piston pumps) that "injects" a given amount of FW in a given time interval into the SW-side of the membrane. Hydraulic pressure is maintained at this side by the SW feed line 11 in PRO operation. The energy to the pump 31 is recovered in the turbine (minus efficiency loss).

Thus, in the embodiment of FIG. 3, there is introduced by means of the pump 31 a plug of FW on the first side or FW side of the membrane of module 13' to alter concentration of dissolved substance(s) (in effect: salinity) in SW thereat, and PRO pressure backwash function is thereby created with FW from the first side (SW side) to the second side (FW side) of the membrane by using the high pressure of SW on said first side to pressurize said plug of FW. This basic principle is also valid for the embodiments of FIGS. 4-9.

Figure 4:
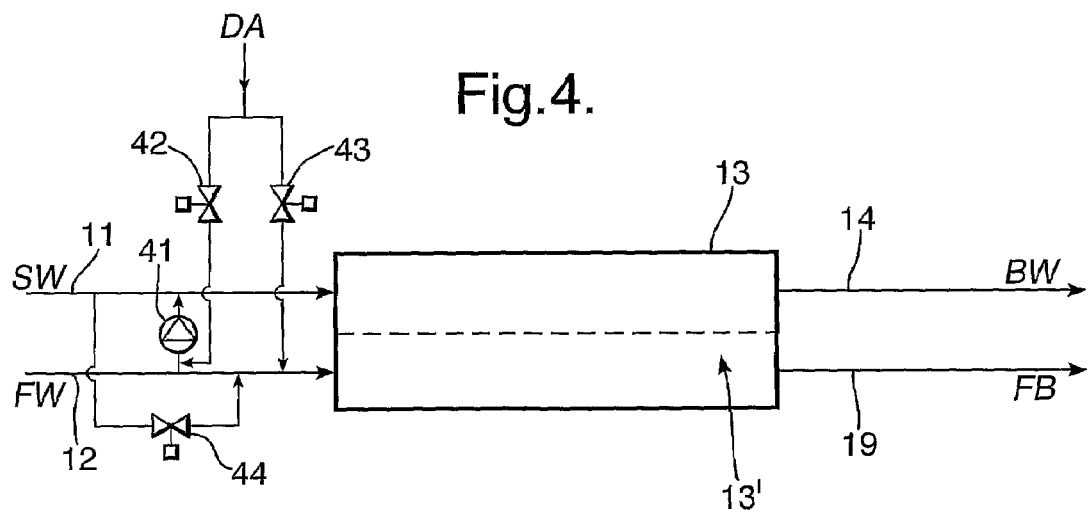
FIG. 4 illustrates an osmosis enhanced PRO pressure backwash embodiment.

FIG. 4 illustrates the principle of osmosis enhanced PRO pressure backwash.

The pump 41 has the same function as pump 31 in FIG. 3. However, at the same time the pump 41 operates, a valve 44 operates to inject SW to the FW side of the membrane 13' in module 13 and which enhances the backwash function by adding an osmotic driving force and flux to the PRO pressure backwash, as illustrated in FIG. 2d.

Figure 5:
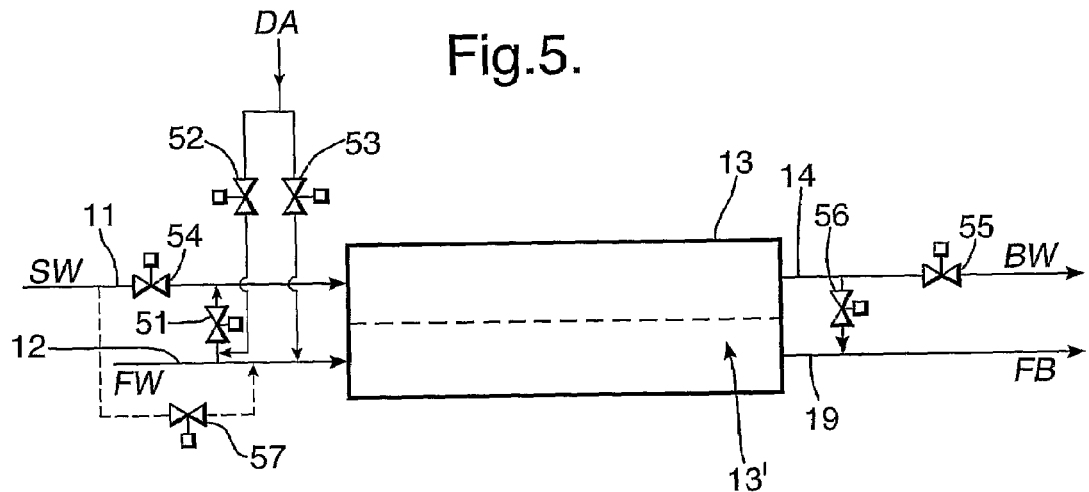
FIG. 5 illustrates a PRO pressure backwash with pressureless freshwater injection.

FIG. 5 illustrates PRO pressure backwash with pressureless freshwater injection.

In this embodiment a valve 54 and a valve 55 shut off SW and BW, respectively. Subsequent opening of a valve 56 releases the pressure on the SW side of the membrane 13' in module 13 and allows FW to flow to this side (SW side) of the membrane 13' through an opened valve 51. When valves 51 and 56 are subsequently closed and valves 54 and 55 are opened, a backwash function will be created. As shown by dotted lines, optionally SW can be led to the FW-side of the membrane by means of a further valve 57 from the SW feed-in pipe to the FW inlet to add osmotic flux. However, this latter option will add to the number of valves required, the plant complexity and cost.

Figure 6A:
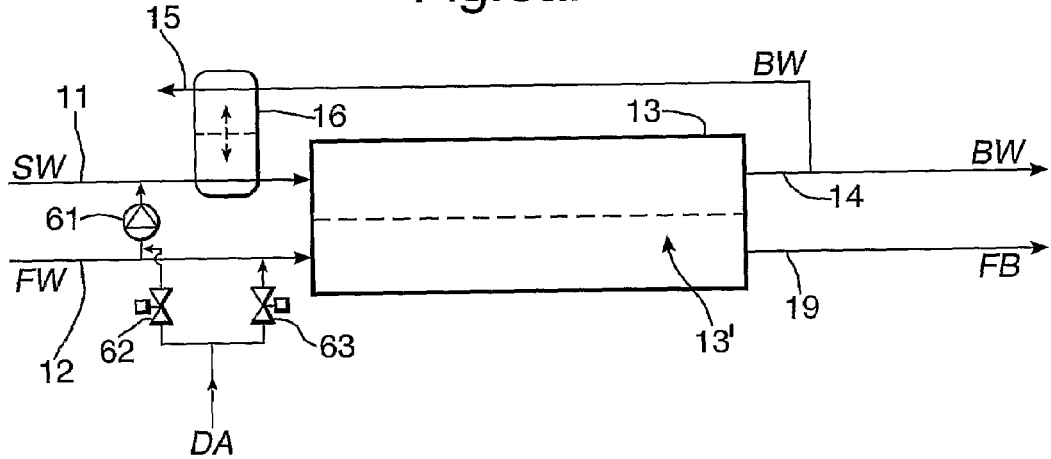
FIGS. 6a and 7 illustrate backwash embodiments utilizing exchanged PRO, the FIG. 6a embodiment using pump assistance, and the FIG. 7 embodiment using valve operation.

FIG. 6a illustrates backwash by exchanged PRO pressure, using a pump 61 to provide the plug of FW to the SW side of the membrane 13'.

The pump 61 is a suitably low-pressure pump that has sufficient pumping power to overcome the pressure in SW feed line 11 upstream of the pressure exchanger 16 and therefore replace SW with a plug of FW in the liquid feed to the exchanger 16, thereby injecting FW to the SW side of the membrane 13'. The operation is quite similar to the embodiment of FIG. 3, except that only a low-pressure type pump 61 is needed and the power loss in the power plant is smaller.

Figure 7:
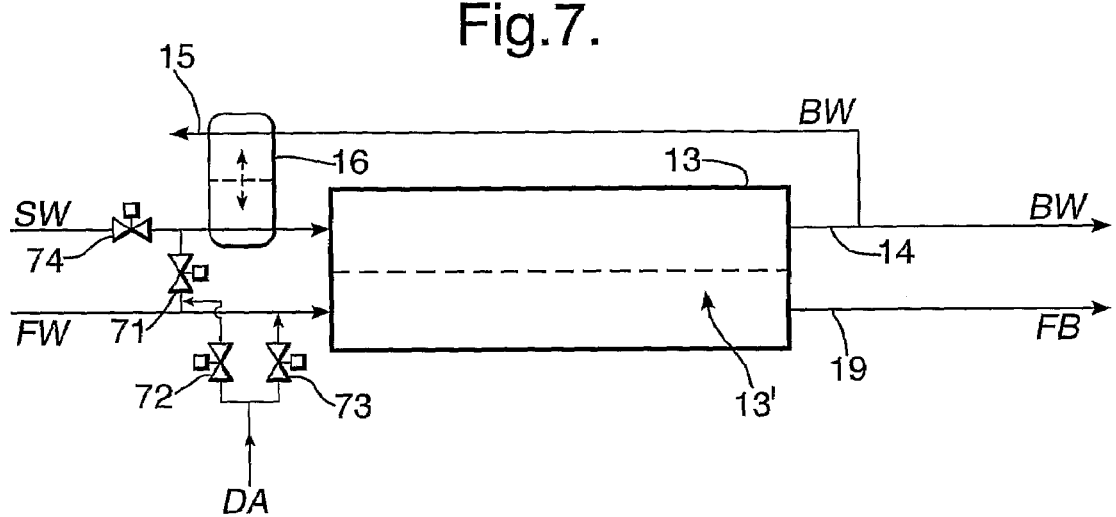

FIG. 7 illustrates backwash by exchanged PRO pressure, using assistance from a pair of valves 71 and 74 instead of the pump 61 in FIG. 6a.

The valve 74 shuts off the SW feed-in to the pressure exchanger 16 and FW is led to the pressure exchanger 16 by opening the valve 71. Otherwise the principle is similar to that of FIG. 6. Subsequently, after the plug of FW has been introduced to the SW side, the valve 71 will close and valve 74 will open.

Figure 6B:
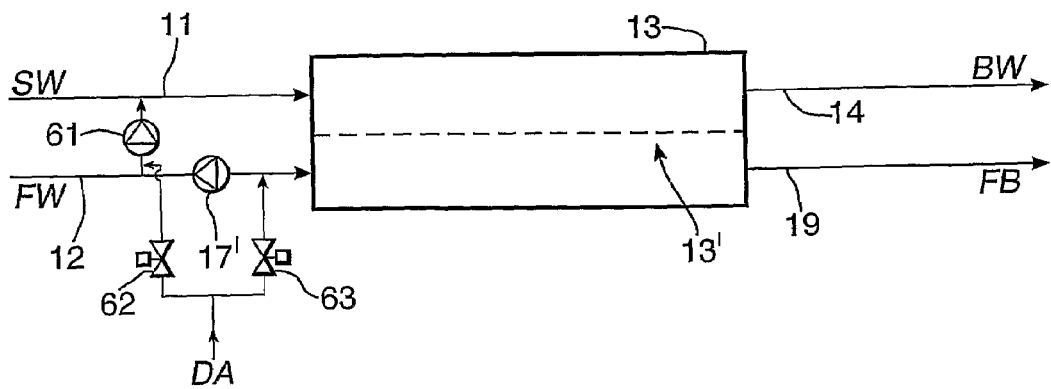

FIG. 6b, being a sub-surface variant of the embodiment of FIG. 6a, has similar operation to the embodiment of FIG. 6a as regards backwash function. However, it is noted, as discussed in relation to FIGS. 1b and 11, that the turbine 17' is located on the FW side of the membrane 13' upstream thereof.

FIG. 6b also provides backwash by existing PRO pressure, using a pump 61 to provide the plug of FW to the SW side of the membrane 13. The pump 61 is a suitably low-pressure pump that has sufficient pumping power to overcome the pressure in SW feed line 11 upstream of the membrane and therefore replace SW with a plug of FW in the liquid feed to the high pressure side of the membrane 13', thereby injecting FW to the SW side of the membrane 13'. The operation is thus quite similar to the embodiment of FIG. 6a, however with the difference that there is a sub-surface installation which in effect makes the pressure exchanger 16 superfluous, and also similar to the embodiment of FIG. 3, except that only a low-pressure type pump 61 is needed and the power loss in the power plant is smaller.

Figure 8:
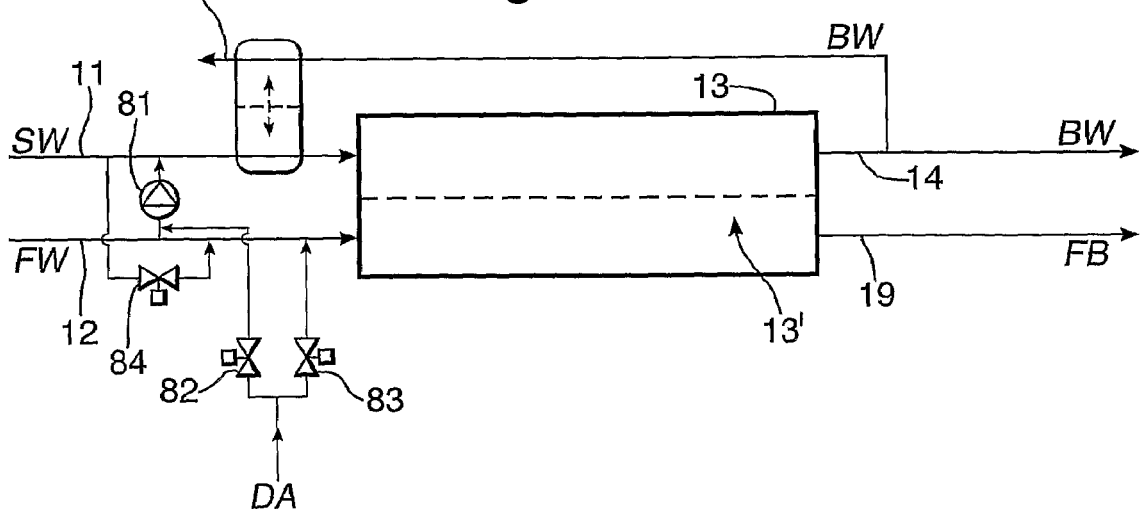
FIGS. 8 and 9 illustrate osmosis enhanced PRO pressure backwash embodiments, the FIG. 8 embodiment having pump assistance, and the FIG. 9 embodiment using valve operation.
Figure 9:
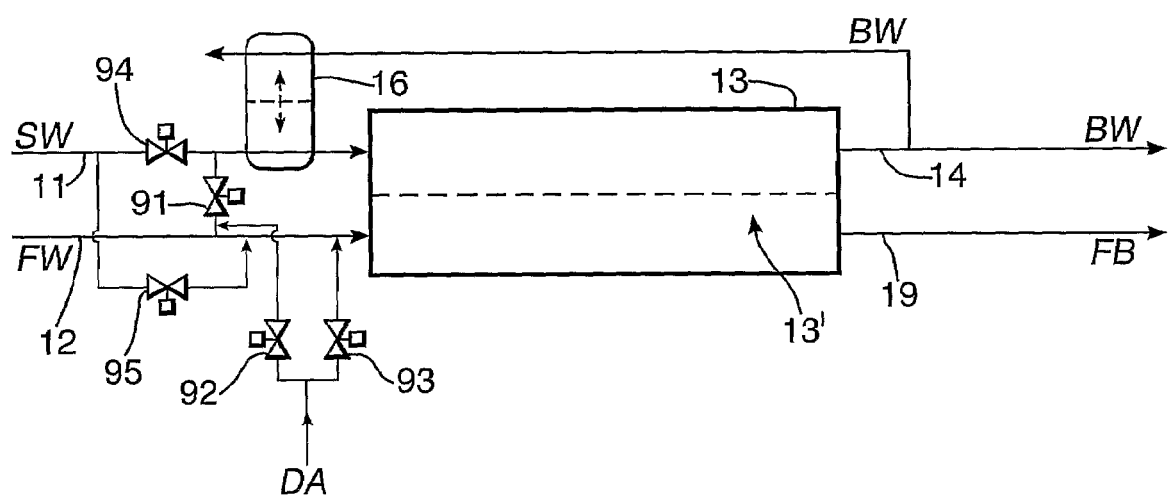

The embodiments of FIGS. 8 and 9 are both related to osmosis-enhanced PRO pressure backwash.

In FIG. 8 the embodiment is pump operated as regards the injection of a plug of FW to the SW side of the membrane 13'.

Thus, injection of FW to the SW-side of the membrane is achieved by a low-pressure pump 81 like the type of pump 61 depicted in FIG. 6. When the pump 81 operates, a valve 84 will operate to lead SW to the FW side of the membrane 13', which enhances the backwash by adding an osmotic driving force and flux to the PRO pressure backwash, as disclosed in FIG. 2d.

In the FIG. 9 embodiment the pump 81 of FIG. 8 is replaced by two valves 91 and 94. The injection of FW to the SW side of the membrane 13' is thus achieved as in the embodiment of FIG. 7. The valve 94 closes and the valve 91 opens in order to introduce a plug of FW to the inlet of the pressure exchanger and subsequently to the SW side of the membrane 13'. At the same time a valve 95 leads SW to the FW side of the membrane 13', adding an osmotic driving force and flux to the PRO pressure backwash, as in the embodiment of FIG. 8. Subsequently, after the plug of FW has been introduced to the SW side, the valves 91 and 95 will close and the valve 94 will open.

Thus, it will be appreciated that the plug of FW injected on the SW side of the membrane will require that SW high pressure is subsequently there to forcibly push the FW plug from the SW side to FW side of the membrane.

In FIGS. 3 through 9 there has been indicated a valve 32, 42, 52, 62, 72, 82 and 92, respectively, the operation of which is to inject a disinfecting agent DA into the plug of FW when the latter is injected to the SW side of the membrane.

In FIGS. 3 through 9 there has also been indicated a valve 33, 43, 53, 63, 73, 83 and 93, respectively, the operation of which is to inject a disinfecting agent DA into the FW so as to let the DA enter the membrane 13' from the low pressure side, i.e. the FW side, thereof a predetermined time prior to injecting said plug of FW to the SW side of the membrane 13'. The advantage of this disinfecting operation is that the DA will move into the membrane 13' and be stopped by the diffusion skin 13", and when the backwashing commences with FW moving from the SW side to FW side of the membrane 13', bacteria and other undesirable micro-organisms located in the membrane 13' will be flushed out together with the DA.

DA provided to the SW side of the membrane 13', i.e. to the SW side of the diffusion skin will merely take care of bacteria and other undesirable micro-organisms on the surface there of. Thus, DA can be applied to either side of the membrane 13' or just one, as deemed necessary. Suitably, said DA is a chlorine solution, although other agents may be used.

Figure 10:
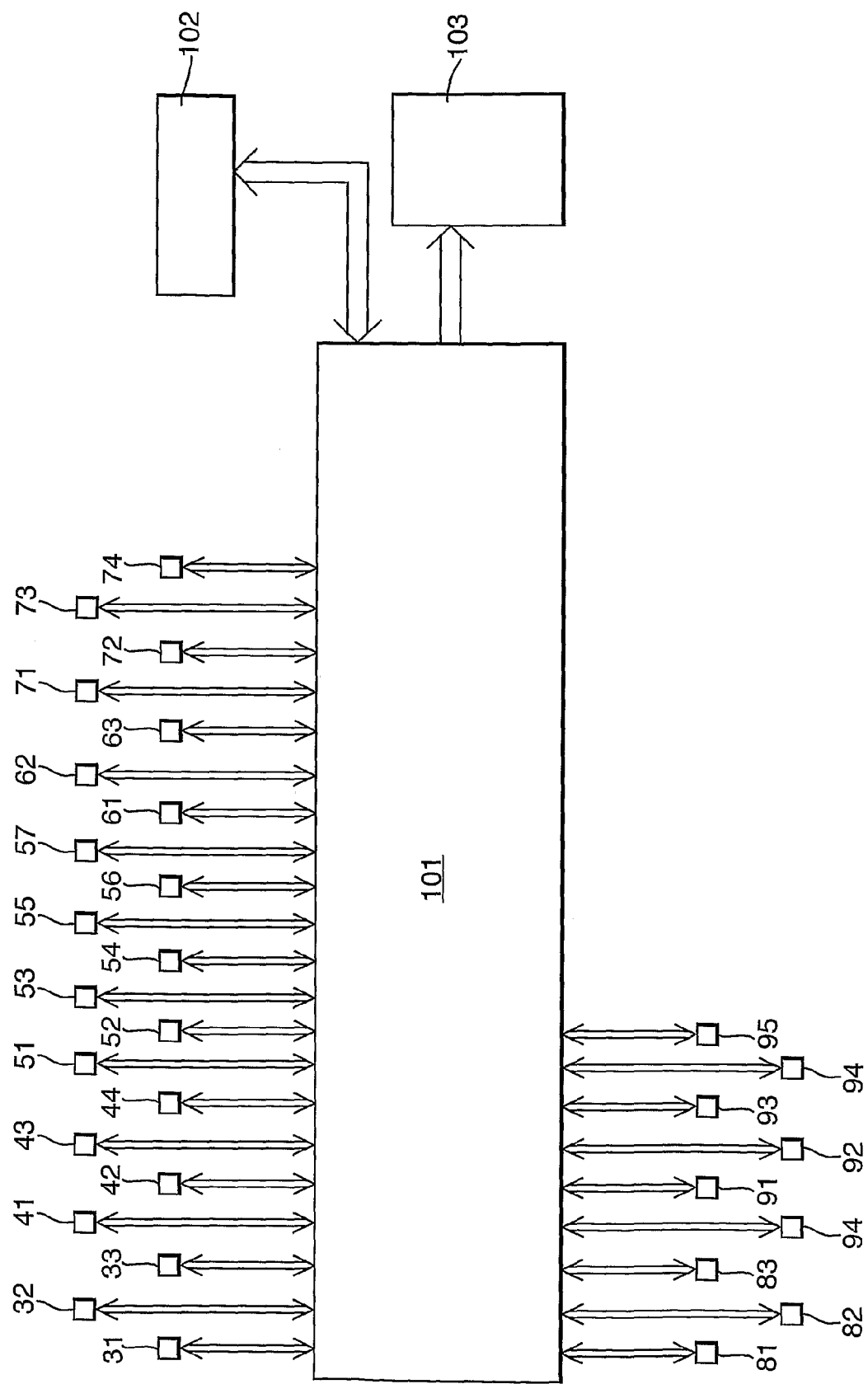
FIG. 10 is a simplified block diagram to illustrate remote control of operation of pumps and valves depicted in the respective drawings of FIGS. 3-9.

FIG. 10 illustrates a control and processing unit 101 which may operate automatically according to a maintenance program or have overriding means 102 to enable manual control by an operator (not shown). A display 103 is suitably provided to enable an operator to monitor how a backwash operation progresses in the power plant. The unit 101 has outputs to control operation of the pumps and valves as required, i.e. to control start and stop of the pumps and opening and closing of the valves as required. The unit 101 can suitable have a microprocessor or PC structure, governed by suitable software and/or firmware.

Figure 11:
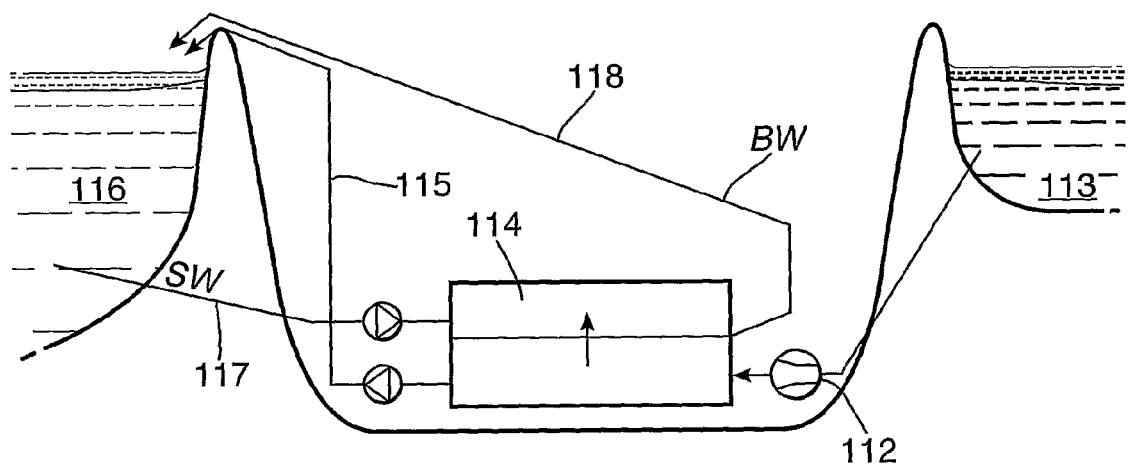
FIG. 11 illustrates a practical embodiment of the continuous subsurface PRO power plant schematically shown on FIG. 1b.

FIG. 11 illustrates a continuously operating sub-surface PRO power plant. FW feed 111 is provided to a turbine 112 (similar to the turbine 17' on FIGS. 1b and 6b) from a FW supply 113, e.g. a river. A module rig 114 (similar to membrane rig 13) is on the FW side connected to the outlet from the turbine 112, and the FW bleed FB 115 from the module rig 114 is directed to a SW reservoir 116, e.g. the sea. SW feed 117 enters the high pressure side of the membrane rig 114 and exits the membrane rig 114 as BW which is fed via line 118 back to the reservoir 116.

Although just one module rig 114 is shown on FIG. 11, and also on other drawing figures, it will be understood that a plurality or even a substantial plurality of membrane modules 13; 114 would normally be involved in the operation of a PRO power plant.

Further, it will be appreciated that the principles of backwash operation as disclosed in connection with FIGS. 5, 6a, 7, 8 and 9 will apply equally well in case the turbine instead is located on the FW upstream side of the membrane rig, thus implying that backwash operation is to be made on a subsurface installation, rather than on a surface installation.

The invention claimed is:

1. A method for performing maintenance on a membrane having semi-permeable properties for normal operation based on pressure retarded osmosis (PRO), the membrane having a first side and a second side, said membrane upon its normal PRO operation being configured on its first side to receive a first type of water having a first concentration of dissolved substance(s) at a first and higher pressure of between about 4-30 bar, and on said second side to receive a second type of water having a second and lower concentration of dissolved substance(s) at a second and lower pressure, wherein during normal PRO operation water flows across the membrane from the second side to the first side, the method comprising:
   temporarily interrupting the normal operation of the membrane by introducing a volume of the second type of water on the first side of the membrane, and
   creating a backwash function from the first to the second side of the membrane by applying the higher pressure of the first side onto the volume of water of the second type.

2. A method according to claim 1, comprising the steps of:
   a) temporarily shutting off a supply of the first type of water to the first side before introducing the volume of the second type of water to said first side, with an outlet from the first side of the membrane being connected only to an outlet from the second side of the membrane,
   b) shutting off a supply of water of the second type to the first side of the membrane and shutting off connection between said outlets, and
   c) applying water of said first type upstream of said volume of water of said second type.

3. A method according to claim 1, wherein said volume of said second type of water is applied to said first side when supply of water of the first type is temporarily shut off, and wherein the volume of water of the second type to the first side of the membrane is subsequently shut off and the supply of the first type of water is restored.

4. A method according to claim 1, wherein said volume of water of the second type is applied temporarily to said first side into a flow of water of the first type.

5. A method according to claim 1, wherein the volume of water of the second type is supplied to the first side at a pressure which exceeds the high pressure of the first type of water.

6. A method according to claim 1, further comprising:
   introducing on the second side of the membrane a volume of water of the first type.

7. A method according to claim 6, wherein the volume of water of the first type introduced on the second side has a delivery pressure equal to or higher than said second pressure, but lower than said first pressure.

8. A method according to claim 1, further comprising injecting a disinfecting agent into the water of the second type during normal PRO operation so as to let the disinfecting agent enter the membrane from the second side thereof a predetermined time prior to introducing said volume of water of the second type to the first side of the membrane.

9. A method according to claim 1, further comprising injecting a disinfecting agent into the volume of water of the second type when said volume is delivered to said first side of the membrane.

10. A method according to claim 1, wherein said concentration of dissolved substance(s) is related to salinity, the first type of water being seawater and the second type of water being freshwater.

11. A system for performing maintenance in a pressure retarded osmosis (PRO) apparatus comprising a membrane having a first side and second side, said membrane upon its normal PRO operation being configured on its first side to receive a supply of a first type of water having a first concentration of dissolved substance(s) at a first and higher pressure of between about 4-30 bar, and on said second side to receive a supply of a second type of water having a second and lower concentration of dissolved substance(s) at a second and lower pressure, wherein during normal PRO operation water flows across the membrane from the second side to the first side; the system comprising:
- a time controllable first valve or pump connected between an input to the second side of the membrane and an input to the first side of the membrane, said first valve or pump operable to selectively deliver a volume of the second type of water to the first side of the membrane, thereby creating a reverse flow of water across the membrane from the first side to the second side.

12. A system according to claim 11, further comprising:
- a second controllable valve configured to control the supply of the first type of water to the first side of the membrane, the second controllable valve being connected upstream of the first valve or pump;
- a third controllable valve configured to control the flow of water at an outlet from the first side of the membrane; and
- a fourth controllable valve connected between the outlet from the first side of the membrane and an outlet from the second side of the membrane, the fourth controllable valve being connected upstream of the third valve.

13. A system according to claim 12, the system being configured in a first operational state to cause said second and third valves to close and said first and fourth valves to open, and in a second state to close the first and fourth valves and opening the second and third valves, thereby causing the reverse flow to be effected.

14. A system according to claim 11, wherein said first valve is connected to said input to the first side of the membrane either directly or via an inlet of a pressure exchanger, wherein a second controllable valve is connected upstream of the input to the first side of the membrane either directly or via the pressure exchanger, said first valve connected to a delivery pipe for the first type of water either at a location between the second valve and the membrane or between the second valve and the inlet to the pressure exchanger.

15. A system according to claim 11, wherein said first valve or pump is configured to deliver temporarily said volume of water of the second type (FW) into a flow of water of the first type.

16. A system according to claim 11, wherein said pump is configured to supply the volume of water of the second type to the first side of the membrane at an output pressure which exceeds said high pressure of the water of the first type.

17. A system according to claim 11, further comprising a third controllable valve connected between the input to the first side and the input to the second side of the membrane, said third valve controllable to introduce on the second side of the membrane a volume of water of the first type.

18. A system according to claim 17, wherein the volume of water of the first type delivered to the second side by said third controllable valve has a delivery pressure equal to or higher than said low pressure, but lower than said high pressure.

19. A system according to claim 11, further comprising a disinfectant injector configured to controllably inject a disinfecting agent into the water of the second type upstream of the low pressure side of the membrane to let the disinfecting agent enter the membrane from the low pressure side thereof for a predetermined time during said normal PRO operation of the membrane prior to introducing said volume of water of the second type to the first side of the membrane to interrupt the normal operation and commence the reverse flow.

20. A system according claim 11, further comprising a disinfectant injector configured to controllably inject a disinfecting agent into the volume of water of second type.

21. A system according to claim 11, wherein said concentration of dissolved substance(s) is related to salinity, the first type of water being seawater and the second type of water being freshwater.

22. A pressure retarded osmosis (PRO) system comprising:
- a membrane having a first side and second side;
- a first input configured to supply a first type of liquid having a first concentration of dissolved substance(s) to the first side of the membrane at a first pressure;
- a second input configured to supply a second type of liquid having a second and lower concentration of dissolved substance(s) to the second side of the membrane at a second and lower pressure, wherein during normal PRO operation permeate flows from the second side of the membrane to the first side of the membrane; and
- a time controllable valve or pump connected between the second input and the first input, said valve or pump operable to selectively deliver a volume of the second type of liquid to the first input so as to temporarily create a reverse flow of permeate from the first side of the membrane to the second side of the membrane during operation of the system.

* * * * *

UNITED STATES PATENT AND TRADEMARK OFFICE
CERTIFICATE OF CORRECTION

| | | |
|---|---|---|
| PATENT NO. | : 7,972,514 B2 | |
| APPLICATION NO. | : 12/158321 | |
| DATED | : July 5, 2011 | |
| INVENTOR(S) | : Thor Thorsen et al. | |

It is certified that error appears in the above-identified patent and that said Letters Patent is hereby corrected as shown below:

At Title Page 1 (Item 57), Abstract, Line 11, Change "substance (s)" to --substance(s)--.

At Column 1, Line 29, Change "in stead" to --instead--.

At Column 2, Line 28, Change "in stead" to --instead--.

At Column 10, Line 27 In Claim 20, Change "claim" to --to claim--.

Signed and Sealed this
Sixth Day of March, 2012

David J. Kappos
*Director of the United States Patent and Trademark Office*